United States Patent [19]

Duffield

[11] Patent Number: 4,996,597

[45] Date of Patent: Feb. 26, 1991

[54] USER PROGRAMMABLE SWITCHING ARRANGEMENT

[75] Inventor: David J. Duffield, Indianapolis, Ind.

[73] Assignee: RCA Licensing Corporation, Princeton, N.J.

[21] Appl. No.: 340,980

[22] Filed: Apr. 20, 1989

[51] Int. Cl.$^5$ .................. H04N 5/268; H04N 5/50
[52] U.S. Cl. .................. 358/181; 358/191.1; 358/194.1; 455/135
[58] Field of Search .................. 358/181, 193.1, 191.1, 358/195.1, 903, 194.1; 455/135, 184

[56] References Cited

U.S. PATENT DOCUMENTS 3,841,367  6/1989  Ichikawa .................. 358/181
4,488,179  12/1984  Kruger .................. 358/181
4,821,122  4/1989  Teskey .................. 358/181

OTHER PUBLICATIONS

CTC-140 Color TV Chassis Technical Training Manual, p. 21, 64 and 68.

*Primary Examiner*—Tommy P. Chin
*Attorney, Agent, or Firm*—Joseph S. Tripoli; Peter M. Emanuel; Thomas F. Lenihan

[57] ABSTRACT

A switching system for a television receiver allows a user to specify which of several input connectors is assigned to which of several signal sources. Thereafter, upon selection of a particular signal source, the system automatically selects the input connector associated with the selected signal source.

16 Claims, 6 Drawing Sheets

USER PROGRAMMABLE SWITCHING ARRANGEMENT

FIELD OF THE INVENTION

This invention relates to the field of signal switching arrangements in audio-video systems.

BACKGROUND OF THE INVENTION

The term "television receiver" as used herein includes television receivers having a display device (commonly known as television sets), and television receivers without a display device, such as videocassette recorders (VCR's).

The term "television receiver" as used herein also includes television monitor/receivers having an RF tuner and baseband signal input circuitry.

Modern television receivers allow selection of external baseband audio and video signals from audio and video sources such as VCR's and videodisc players, as well as selection of broadcast television programs tuned and demodulated by a built-in tuner and intermediate frequency (IF) circuitry.

The external audio and video signals are coupled to individual input terminals (jacks) of a connection panel usually located on the rear portion of the television receiver. These input terminals, and the output terminals of the internal tuner/IF circuitry, are coupled to the signal processing circuits of the television receiver via a signal switch assembly. Such a switch assembly is desirably electronically controlled to select the proper audio and video signals.

A television receiver having multiple electronically selectable auxiliary baseband signal inputs is known from the RCA CTC-140 manufactured by Thomson Consumer Electronics, Inc. Indianapolis, Ind. This television receiver employs digital switching logic to automatically provide proper audio and video when each of the video source selections is made (i.e., tuner, AUX1 or AUX 2).

An S-VIDEO signal source, such as an S-VHS VCR or an S-VHS Camcorder, provides wideband luminance and chrominance signals on separate terminals of an S-VIDEO connector. Modern VCR's may produce output signals on any or all of the following: a baseband video out connector, an S-VIDEO out connector, or an RF out connector. In addition, the RF out signal may be modulated to channel 3, or channel 4. This arrangement provides a flexible system allowing connection of signals to a wide variety of television receivers. Unfortunately, this flexibility is also a source of confusion to a user who may have forgotten exactly how the units were connected together, and who would therefore have difficulty in selecting the proper input to which a VCR signal is actually applied.

U.S. Pat. No. 4,821,122 (Teskey) issued in April 11, 1989 discloses a system in which in response to the reception of a "VCR ON" remote control command, a television receiver, to which the VCR is connected, automatically selects the AUX1 baseband video input as the signal source. If no signal is found at the AUX1 input, then the television receiver switches to the tuner, and tunes channel 3, and then channel 4 in succession, searching for input signals from the VCR. Thus, a user may select the VCR for viewing without knowing how the VCR was actually connected to the television receiver. However, suppose that a user has a baseband video signal source, other than the desired VCR, connected to AUX1. In this case, the automatic signal seeking function will not locate the VCR but will find an active signal at the AUX1 input, and thus will be "fooled" into selecting the signal at the AUX1 input.

SUMMARY OF THE INVENTION

A switching system allows a user to specify which of several input connectors or channels is assigned to which of several signal sources, and store the connector or channel assignment data in memory. Thereafter, upon selection of a particular signal source, the system automatically selects the input connector or channel associated with the selected signal source in response to the stored data.

DETAILED DESCRIPTION OF THE EMBODIMENT

Figure 1:
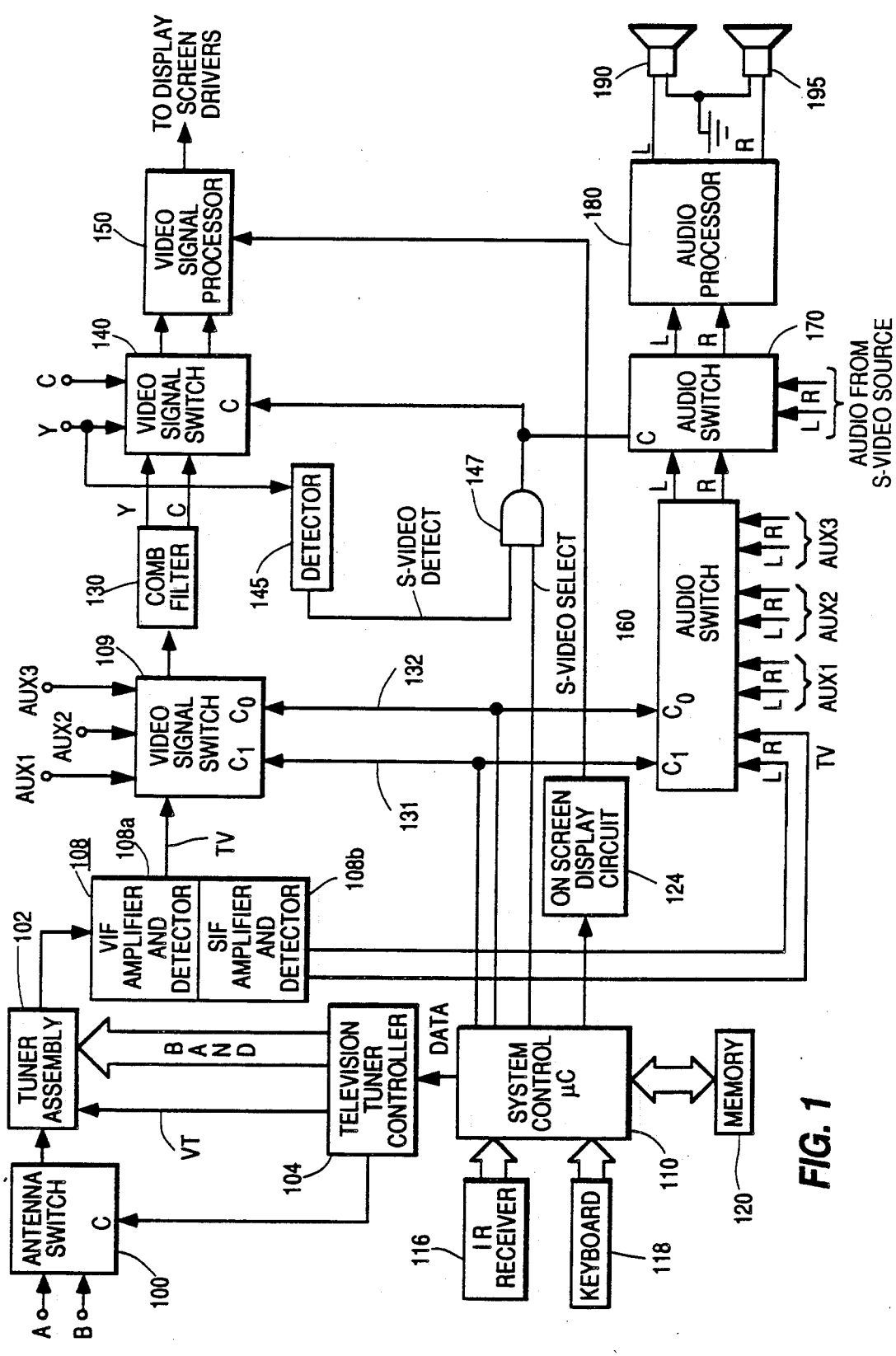
FIG. 1 shows, in block diagram form, a system suitable for use with the invention.

Referring to FIG. 1, a television receiver includes an antenna switch unit 100 which receives radio frequency (RF) signals at RF inputs A and B and applies a selected one of them to a tuner assembly 102. Tuner assembly 102 selects and amplifies a particular RF signal under control of a tuner controller 104, which provides bandswitching signals and tuning voltage signals VT to tuner assembly 102, and an antenna switching control signal to a control input C of antenna switch unit 100.

Tuner assembly 102 converts the received RF signal to an intermediate frequency (IF) signal and provides an IF output signal to IF amplifier and detector 108. IF amplifier and detector 108 comprises a video IF amplifier and detector portion 108a, and a sound IF amplifier and detector portion 108b. IF amplifier and detector 108 amplifies the IF signal applied to its input terminal and detects the video information contained therein. This detected video information is applied as one input to a video signal multiplexer switch unit 109. Detector 108 also detects sound information which is applied to a sound switching and processing channel comprising audio switch 160, audio switch 170, audio processing unit 180 and speakers 190 and 195.

Tuner controller 104 generates the before-mentioned tuning voltage signals and bandswitching signals in response to control signals applied from a system control microcomputer (μC) 110. Microcomputer 110 receives user-initiated commands from an infrared (IR) receiver 116 and from a keyboard 118. Microcomputer 110 includes program memory (ROM) (not shown) and stores channel-related data in a random access memory (RAM) 120. RAM 120 may be of either the volatile or non-volatile type. One skilled in the art will recognize that if volatile memory is utilized that it may be desirable to use a suitable form of standby power to preserve its contents when the receiver is turned off. Remote control signals are transmitted via infrared light (IR) although other media are possible.

Figure 2:
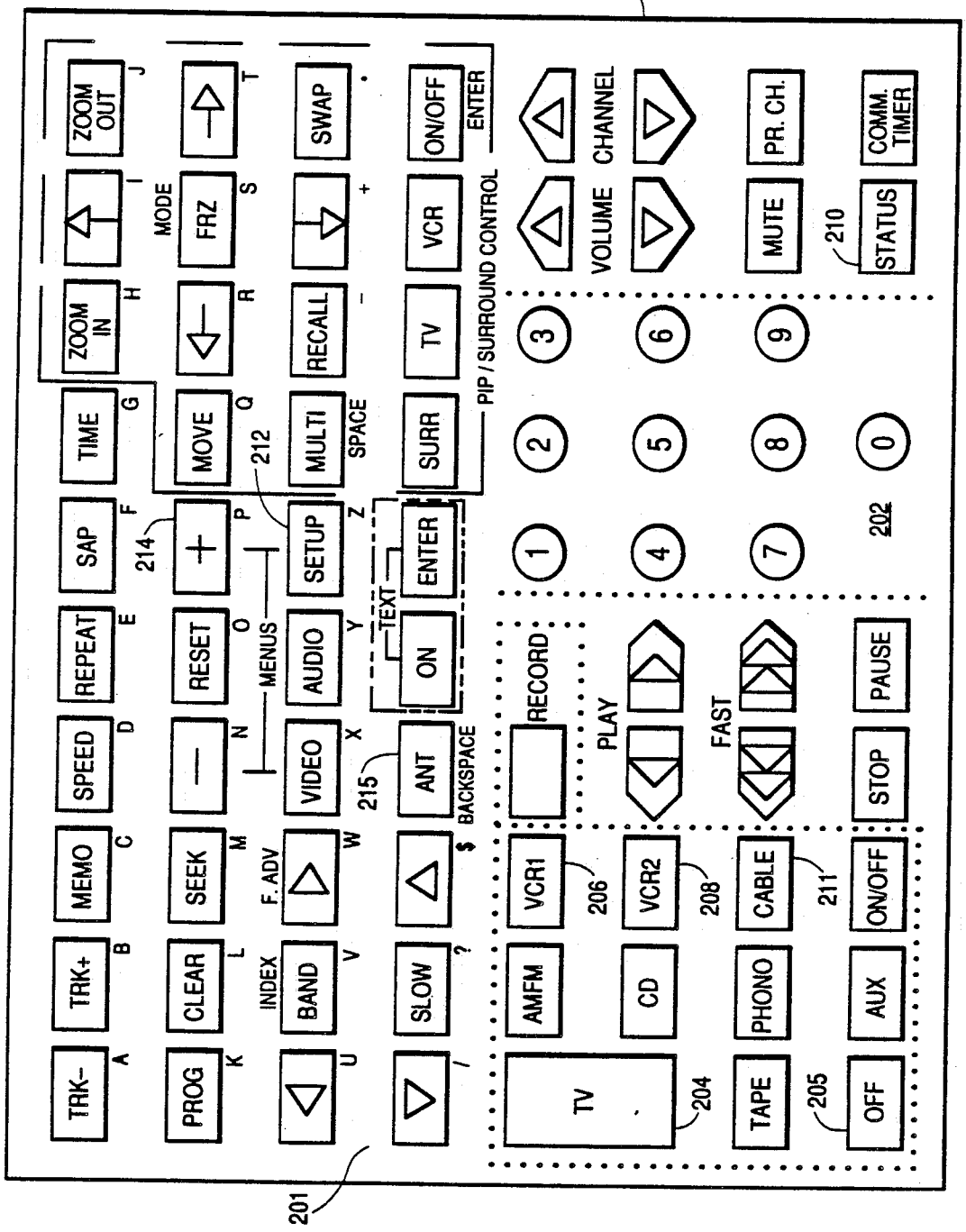
FIG. 2 illustrates a remote control handunit suitable for use with the invention.

IR receiver 116 receives IR signals transmitted by, for example, a remote control handunit such as the one shown in FIG. 2 and designated 200. Referring to FIG. 2, remote control handunit 200 includes keys 202 for entering the digits 0-9, for entering "channel-up" and "channel-down" commands and a key 204 for turning the receiver "on" and a key 205 for turning the receiver "off." Remote control handunit 200 also includes a key 206 (labelled VCR1) a key 208 (labelled VCR2), and a key 211 (labelled CABLE), the operation of which will be described below. Remote control handunit 200 includes therein electronic circuitry (not shown) for encoding a signal to be transmitted by an IR diode in accordance with the particular keys pressed. Similar control function command entries may be made via keyboard 118 located at the receiver itself.

The baseband video signal (TV) is coupled to one input of a four input video switch 109. Video switch 109 has three other inputs labelled AUX1, AUX2, and AUX3, for receiving baseband video signals from external sources. Each of the inputs of video switch 109 is selectable in response to binary signals generated by controller 110 and applied to control inputs $C_1$ and $C_0$ via conductors 131 and 132, respectively. For example, if $C_1$ and $C_0$ are both caused to be at a low signal level (i.e. binary 00), then the TV input is selected. If $C_1$ is low and $C_0$ high (binary 01), then AUX1 is selected. If $C_1$ is high and $C_0$ low (binary 10), then AUX2 is selected. If both $C_1$ and $C_0$ are high (binary 11), AUX3 is selected. Selection of the corresponding audio signals is ensured because control terminals C1 and C0 of audio switch 160 are connected in parallel with control terminals C1 and C0 of video switch 109.

The selected video signal is applied to a comb filter unit 130 which separates luminance (Y) signals and chrominance (C) signals for application to a video processor unit 150 for ultimate display on a display screen. The above-described circuitry is essentially known from the RCA CTC-140 television receiver manufactured by Thomson Consumer Electronics, Inc., Indianapolis, Ind.

A video signal switch unit 140 is coupled between comb filter 130 and video processor 150. Video switch unit 140 selects input signals from comb filter unit 130 whenever a low level signal is applied to control input C, and selects external S-VIDEO signals whenever a high level signal is applied to control input C. The luminance signal Y from the S-VIDEO connector is also coupled to a detector unit 145 which produces a high level binary control signal S-VIDEO DETECT at its output whenever the luminance signal Y is active. The S-VIDEO DETECT signal is applied to one input of AND gate 147. The other input of AND gate 147 is coupled to controller 110 for receiving an S-VIDEO SELECT signal. If both S-VIDEO DETECT and S-VIDEO SELECT signals are present, AND gate 147 produces a high level control signal and applies it to the control terminal C of video switch 140, causing the selection of the S-VIDEO signals. Selection of the corresponding audio signals is ensured because control terminal C of audio switch 170 is connected in parallel with control terminal C of video signal switch 140. A high level signal on control terminal C of audio switch 170 causes the selection of the audio signals produced by the S-VIDEO signal source. The output signals developed by audio switch 170 are applied to audio processor 180 for ultimate reproduction by speakers 190 and 195.

The selected signals from video switch 140 are applied to video signal processor 150, along with On Screen Display (OSD) signals which may be produced by OSD unit 124.

The subject invention will be explained with reference to the display screens of FIGS. 3a-3c, and with reference to the flowcharts of FIGS. 4, 5 and 6.

Figure 3A:
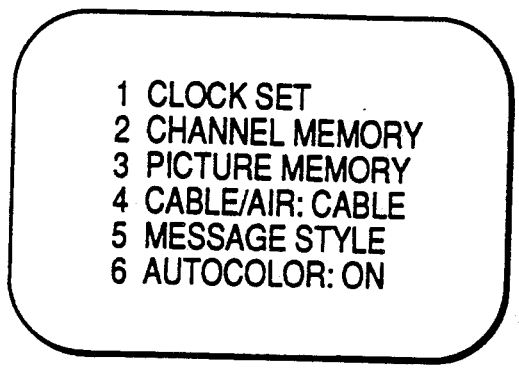
FIG. 3a–3c are illustrations of television receiver display screens displaying a menu messages.
Figure 3B:
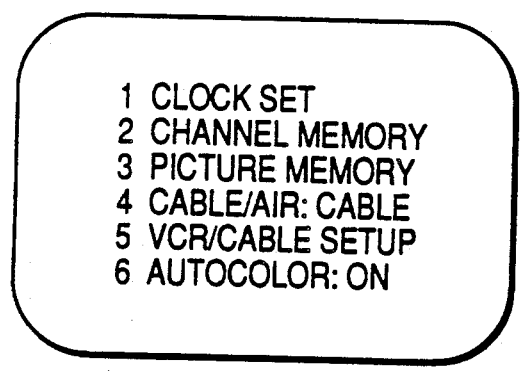

A menu display screen, known from, for example, the above-mentioned RCA CTC-140 television receiver, is shown in FIG. 3a. The display screen of FIG. 3a is generated in response to the pressing of the MENU SETUP key 212 of keyboard 201 of FIG. 2. Six functions are shown, each of which is selected by entering its respective line number via the keyboard of the remote control unit. In apparatus according to the subject invention, the menu display screen of FIG. 3a is modified to form the menu display screen of FIG. 3b. In this case the function MESSAGE STYLE, which controlled selectable type fonts for on-screen text message, is deleted. A new function, VCR/CABLE SET UP, is inserted in the place formerly occupied by MESSAGE STYLE.

Figure 3C:
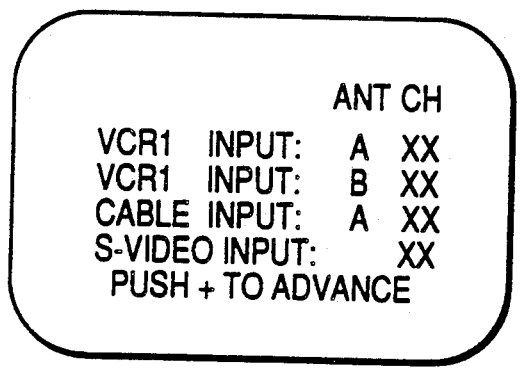

Selection of VCR/CABLE SETUP by pressing key 5 causes the generation and display of the display screen of FIG. 3c. The display screen of FIG. 3c includes a list of devices which may be connected as signal sources to the television receiver. The individual devices of the list (i.e., VCR1, VCR2, and CABLE) have correspondingly labelled keys (i.e, 206, 208 and 211, respectively) on remote control keyboard 201. Pressing a particular one of these keys causes the remote control unit to generate and transmit an "ON" command for that device.

In the display screen of FIG. 3c, the current device line (i.e., VCR1, VCR2, CABLE, S-VIDEO) is desirably highlighted in some fashion to draw the user's attention to it. One example of this highlighting may be to flash the line at some predetermined rate. Preferably, the highlighting is accomplished by displaying the current line in a color different from the remaining lines. The last line "PUSH+TO ADVANCE" is preferably displayed in a third color.

Pressing key 215 (labelled ANT) of keyboard 201 causes the antenna indicator to change state between A and B for each keypress. The XX symbols of FIG. 3c indicate the specific channel at which the device output signal is to be found. For example, VCR1 may be defined as being connected to antenna input A, and producing a signal at the channel 04 RF frequency. In that case, the numerals 04 would replace the symbol XX. However, it is also possible to couple the baseband video out signal from VCR1 to any one of inputs AUX1, AUX2, or AUX3. Channel numbers 91, 92, and 93 correspond to selections of AUX1, AUX2, and AUX3, respectively. If baseband video is selected for any device in the list, then the antenna status indicator (A or B) for that device is blanked, because no antenna selection is needed when baseband video is chosen.

In order to move down to the next line of the display of FIG. 3c, the +key 214 is pressed. This causes the next line to be highlighted, and enables the reception of data related to the next device in the list. Any one of the inputs (AUX1, AUX2 or AUX3) may be specified as an S-VIDEO (wideband luminance) device. This is accomplished by setting the "channel number" CH entry for S-VIDEO to the input number of the input having an S-VIDEO device connected thereto. For example, if VCR1 is an S-VIDEO device, and VCR1 channel number entry CH is 91, VCR1 is specified to be an S-VIDEO device by setting the channel number CH on the S-VIDEO line to channel number 91. Accordingly, when VCR1 is selected by pressing VCR1 key 206 of keyboard 201, the circuitry of FIG. 1 will automatically enable the S-VIDEO input. Preferably, when channel numbers 91, 92 or 93 are entered, the digit "9" will be replaced by the letter "V" for display (i.e., V1, V2 or V3, respectively) to indicate their status as baseband video inputs. These selections are stored in non-volatile memory to preserve them in the event that the television receiver loses power.

Figure 4:
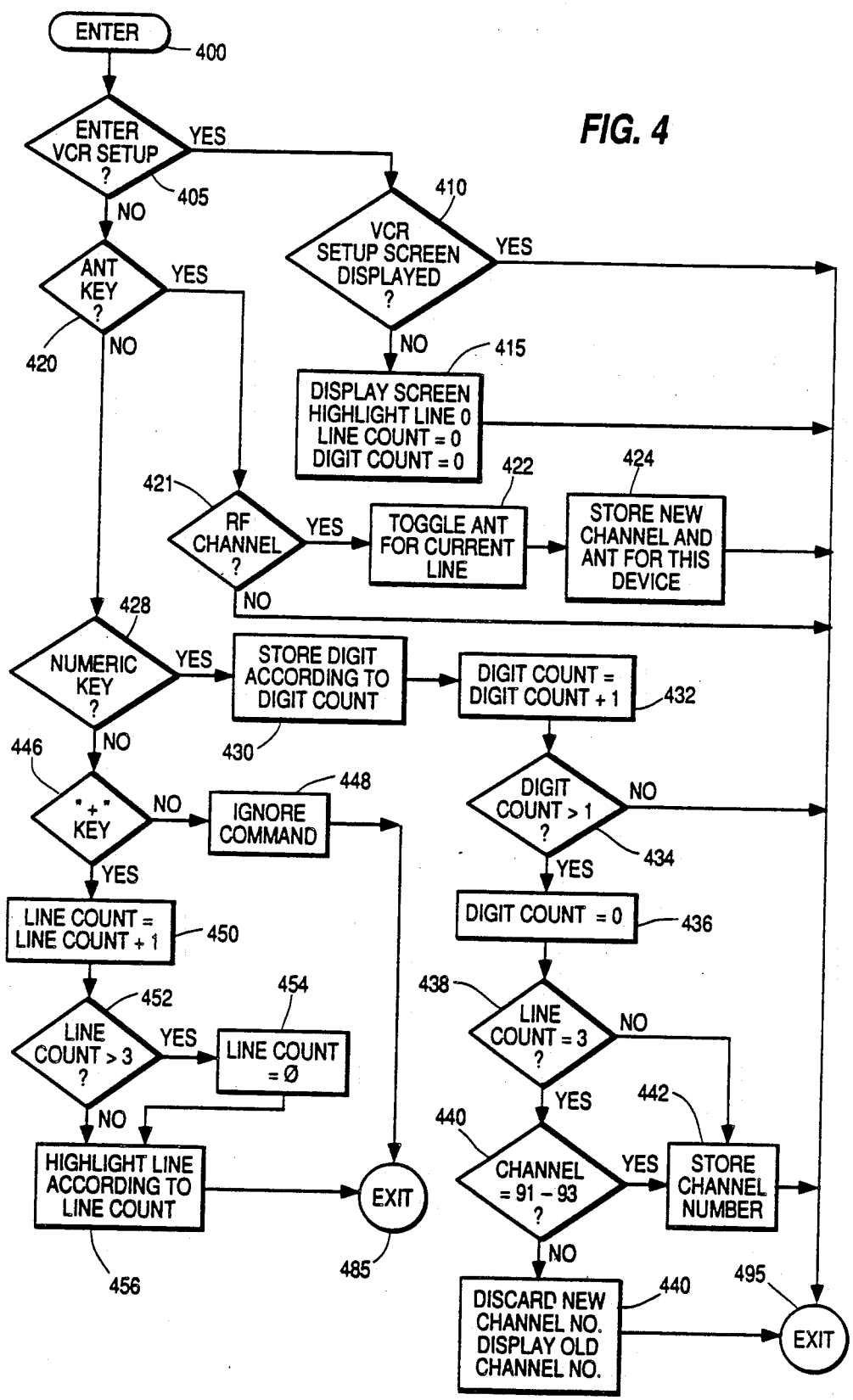
FIGS. 4, 5 and 6 are flowcharts of a program used by the controller of FIG. 1, to implement an embodiment of the invention.

The flowchart of FIG. 4 illustrates the portion of the control program for controller 110 which handles the entering of data for the screen display of FIG. 3c. The routine is entered from other key code handling portions of the program at step 400. At step 405 a decision is made as to whether the keycode corresponds to the enter VCR SETUP choice from the screen display of FIG. 3b (or even from other areas of the program, if so provided). If so, the YES path is taken to step 410 which determines if the VCR SET UP screen (FIG. 3c) is displayed. If it is already displayed, then the routine is exited at Step 495. If not, then the VCR SETUP screen is written to OSD memory, the top line (line 0) of the display is highlighted, a line count is set to zero, a digit count is set to 0 (step 415), and the routine is exited. The line count keeps track of which display line is being addressed by the user. The digit count is used in entering the most significant and the least significant digits of the channel number. If the NO path is taken from step 405, then the received keycode is checked to see if it is the antenna (ANT) keycode (step 420). If it is the ANT keycode, then a check is made to see if the channel number for the current line is an RF channel number (step 421). If so, the antenna display for the current line is toggled (i.e., switched from A to B, or B to A) (step 422), and the new channel and antenna data for the current line is stored in memory (step 424). If the channel number for the current line is not an RF channel number, then the routine is exited. If the received keycode is not ANT, then the NO path is taken from step 420 to step 428. If the keycode is a numeric keycode (step 428), then the number corresponding to the keycode is stored according to the digit count. That is, if the digit count is 0, then the received number is stored in the most significant position of the channel number field of the current line of the display screen of FIG. 3c (step 430). The digit count is incremented (step 432), and checked for overflow (step 434). If the digit count is not greater than 1, then the routine is exited. If it is greater than 1 (overflow), then it is set to 0 (step 436). If current line count is equal to 3 (the S-VIDEO line) (step 438), then a check is made to see if the channel number just entered is 91 through 93 (step 440). If so, then the channel number is stored (step 442). It is also stored when the No path is taken from decision diamond 438. If, however, the new channel number is not in the range from 91 through 93, then it is apparently an error, because the S-VIDEO input must correspond to a baseband selection, and not to an RF selection. Therefore, channel numbers not in the range from 91–93 are discarded and the old channel number for that location is re-displayed (step 444). If the NO path is taken from decision diamond 428, then the received keycode is checked to see if it corresponds to the "+" keycode (step 446). If not, the command is ignored (step 448) and the routine is exited at step 485 (which may in fact be the same exit location as step 495). If the "+" key is received, then the line count is incremented (step 450) and checked for overflow (step 452). If the line count is greater than 3, then overflow has occurred, and the line count is reset to zero (step 454). If the line count has not overflowed, or if program execution passed through step 454, then the appropriate line of the display screen of FIG. 3c is highlighted according to the line count (step 456), and the routine exited. Resetting the line count at step 454 allows the program to "wrap around" by "advancing" from line 3 directly to line 0.

Figure 5:
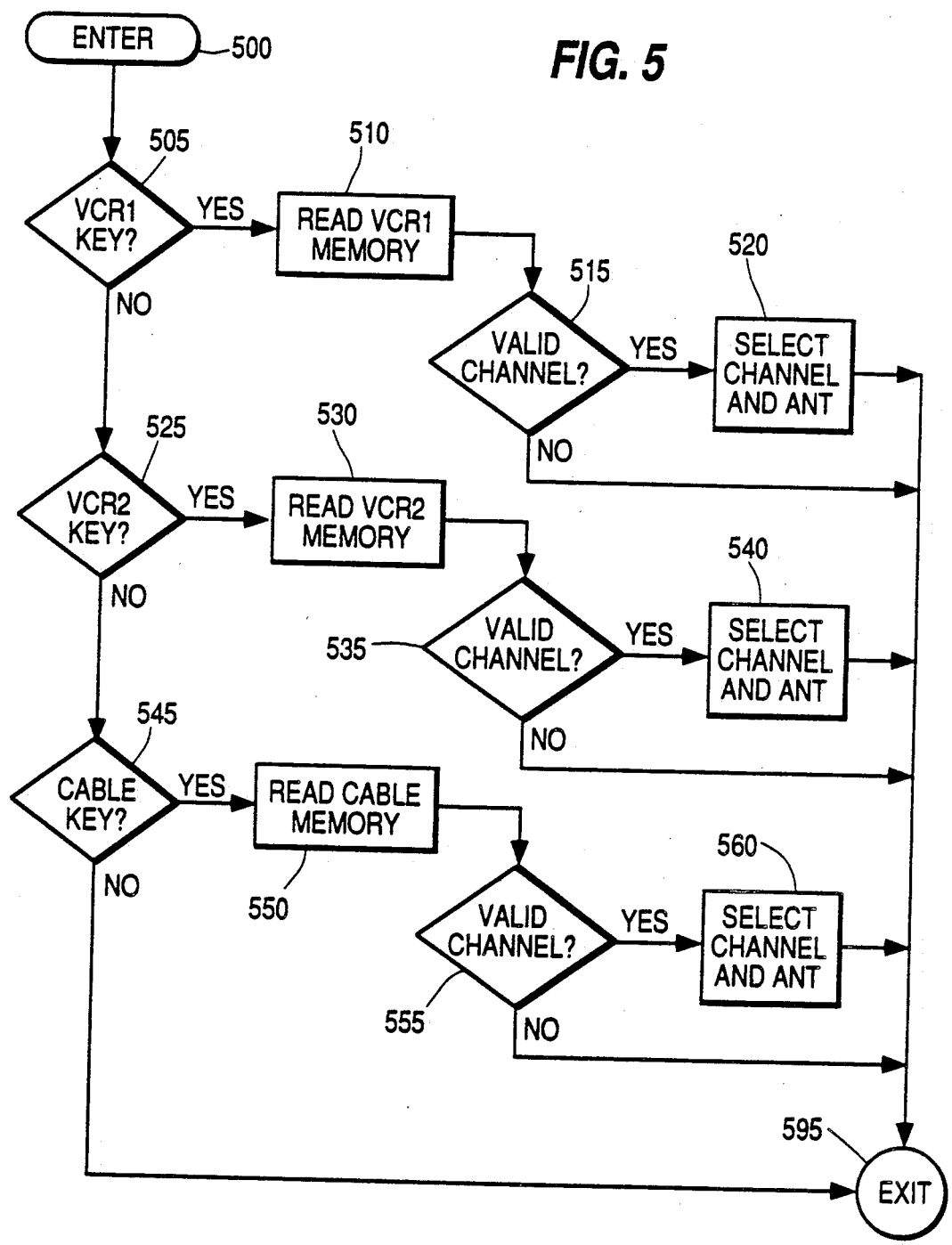

The flowchart of FIG. 5 illustrates how the proper input terminal, antenna selection, and channel number are accessed when a particular device is selected by a user. The routine of FIG. 5 is entered at step 500 from other portions of the control program of controller 10. At step 505 the received keycode is checked to see if it is the "VCR1 ON" keycode (sent for example by the remote control unit when VCR1 key 206 of keyboard 201 is pressed). If it is, then the VCR1 area of memory is read to retrieve the antenna and channel number-data previously stored in that location (step 510). A determination is then made as to whether the channel number is valid (step 515). If not, then the routine is exited at step 595. If it is a valid channel number, then the channel is tuned. In block 520 the term channel refers to both RF channels (which require an antenna selection) and the "channels" 91–93 corresponding to baseband video inputs V1–V3, respectively which do not require an antenna selection.

Flowchart elements 525–540, and 545–560 have functions which correspond to elements 505–520 and which need not be described again in detail.

Figure 6:
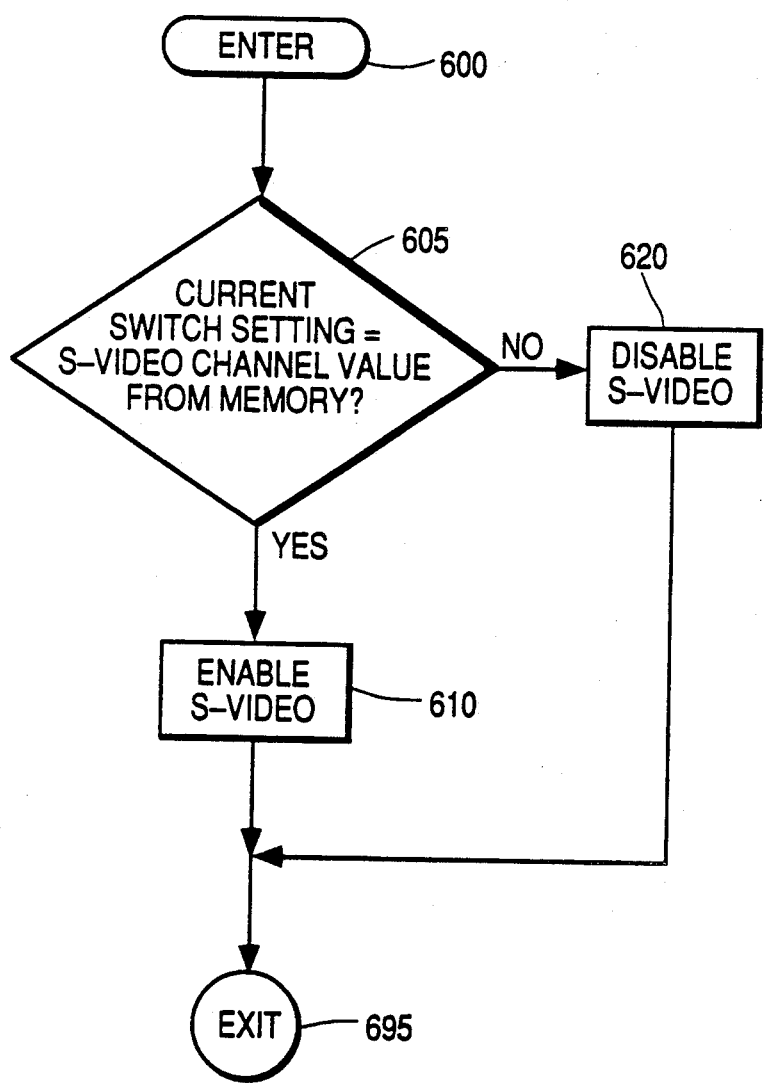

A portion of the audio/video input switching routines is shown in detail in FIG. 6. This routine is entered at step 600, and a determination is made at step 605 as to whether the signal input switches of FIG. 1 are currently set at a value equal to the S-VIDEO channel value from the S-VIDEO area of memory. For example, if the VCR designated as VCR1 is an S-VHS device, and is connected to the AUX1 (i.e., channel 91) input terminals then the S-VIDEO input would also be set to "channel" 91. When channel 91 is selected either by pressing VCR1 key 206 or by entering the channel number 91 via the digit keys 202, then the S-VHS video signal will be selected instead of the composite video signal at the AUXI video input connector. If the YES path is taken from step 605, then the S-VIDEO input circuitry is enabled (step 610). However, if the NO path is taken, then the S-VIDEO circuitry is not enabled (or is disabled if previously enabled) (step 620). The enabling of the S-VIDEO circuitry is accomplished by generating the S-VIDEO SELECT signal referred to above. The routine is exited at step 695.

Thus, a system is provided which enables a user to freely choose which of several input terminals is to be associated with which of several signal sources, without being forced to assign particular devices to specific input terminals. The disclosed system also provides ease of use in that the television receiver automatically selects the proper input configuration when a signal source device is selected.

While the invention was described with reference to a video switching embodiment in a television receiver, it is herein recognized that it is also applicable to an audio only switching system, or to a combination of audio and video switching.

What is claimed is:

1. A signal switching arrangement for a television receiver, comprising:
   a first input terminal for receiving a first signal from one of a plurality of external signal sources;
   a second input terminal for receiving a second signal from another of said plurality of external signal sources;
   means for entering data defining the association of one of a plurality of external signals sources with one of said input terminals in response to activation by a user, and for receiving control signals for controlling ones of said plurality of external signal sources;
   memory means for storing said data;
   switch means having a first input coupled to said first input terminal for receiving said first signal, a second input coupled to said second input terminal for receiving said second signal, a control terminal for receiving a switching control signal, and an output for developing a signal selected from said first and second signals in response to said switching control signal; and
   control means coupled to said switch means, said memory means, and said means for entering data and receiving control signals, and having an output for developing said switching control signal in response to the detection of said control signals for controlling said ones of said plurality of external signal sources, and in response to said stored data defining the association of said one of said plurality of external signal sources with said one of said input terminals.

2. The signal switching arrangement of claim 1, further comprising:
   a third input terminal for receiving an S-video signal from one of said plurality of external signal sources, said third input terminal being coupled to a third input of said switch means, and said output of said switch means being a selected one of said first signal, said second signal, and said S-video signal in response to said switching control signal.

3. The signal switching arrangement of claim 1 wherein said control means is a microprocessor.

4. The signal switching arrangement of claim 1 wherein one of said control signals related to a first one of said external signal sources is a VCR-ON command.

5. A signal switching arrangement for a television receiver, comprising:
   an RF input terminal for receiving a plurality of RF signals;
   tuner means coupled to said RF input terminal for receiving said plurality of RF signals, selecting one of said plurality of RF signals, and converting said selected RF signal to an IF signal at an output in response to a tuner control signal;
   a baseband input terminal for receiving a first baseband signal;
   means for entering tuner control data and data representative of the association of one of a plurality of external signal sources with one of said RF input terminal and said baseband input terminal in response to activation by a user, and for receiving control signals for controlling ones of said plurality of external signal sources;
   memory means for storing said tuner control data and said data representative of the association of said one of said plurality of external signal sources with one of said RF input terminal and said baseband input terminal;
   IF amplifier and detector means coupled to said tuner for receiving said IF signal and producing at a detector output a second baseband signal; and
   switch means having a first input coupled to said baseband input terminal for receiving said first baseband signal, a second input coupled to said detector output for receiving said second baseband signal, a control terminal for receiving a switching control signal, and an output for developing a signal selected from said first and second baseband signals in response to said switching control signal; and
   control means coupled to said switch means, said tuner means, said means for entering data and receiving control signals, and said memory means for generating said tuner control signal in response to said tuner control data, and for developing said switching control signal in response to the detection of said control signals for controlling ones of said plurality of external signal sources, and in response to said stored tuner control data and said stored data representative of the association of said one of said plurality of external signal sources with said respective one of said RF input terminal and said baseband input terminal.

6. The signal switching arrangement of claim 5, further comprising;
   a third input terminal for receiving an S-video signal from one of said plurality of external signal sources, said third input terminal being coupled to a third input of said switch means, and said output of said switch means being a selected one of said first baseband signal, said second baseband signal, and said S-video signal in response to said switching control signal.

7. The signal switching arrangement of claim 5 wherein said control means is a microprocessor.

8. The signal switching arrangement of claim 5 wherein one of said control signals related to a first one of said external signal sources is a VCR-ON command.

9. A signal switching arrangement, comprising:
   a first input terminal for receiving a first signal from one of a plurality of external signal sources;
   a second input terminal for receiving a second signal from another of said plurality of external signal sources;
   means for entering data defining the association of one of a plurality of external signal sources with one of said input terminals in response to activation by a user, and for receiving control signals for controlling ones of said plurality of external signal sources;
   memory means for storing said data;
   switch means having a first input coupled to said first input terminal for receiving said first signal, a second input coupled to said second input terminal for receiving said second signal, a control terminal for receiving a switching control signal, and an output for developing a signal selected from said first and second signals in response to said switching control signal; and
   control means coupled to said switch means, said memory means, and said means for entering data and receiving control signals, and having an output for developing said switching control signal in response to the detection of said control signals for controlling said ones of said plurality of external signal sources, and in response to said stored data defining the association of said one of said plurality of external signal sources with said one of said input terminals.

10. The signal switching arrangement of claim 9, further comprising:
a third input terminal for receiving an S-video signal from one of said plurality of external signal sources, said third input terminal being coupled to a third input of said switch means, and said output of said switch means being a selected one of said first signal, said second signal, and said S-video signal in response to said switching control signal.

11. The signal switching arrangement of claim 9 wherein said control means is a microprocessor.

12. The signal switching arrangement of claim 9 wherein one of said control signals related to a first one of said external signal sources is a VCR-ON command.

13. A signal switching arrangement for a television receiver, comprising:
a first input terminal for receiving a first signal from one of a plurality of external signal sources;
a second input terminal for receiving a second signal from another one of said plurality of external signal sources;
means for entering data in a setup mode of operation during which said data defines a connection of ones of said plurality of external signal sources to respective ones of said first and second input terminals, and in a selection mode of operation during which said data is representative of a user's selection of one of said plurality of external signal sources;
memory means for storing said data entered during said setup mode of operation;
switch means having a first input coupled to said first input terminal for receiving said first signal, a second input coupled to said second input terminal for receiving said second signal, a control terminal for receiving a switching control signal, and an output for developing a signal selected from said first and second signals in response to said switching control signal; and
control means having an input coupled to said memory means for receiving said stored data entered during said setup mode of operation, an input coupled to said data entry means for receiving said user-supplied data during said selection mode of operation, and a control signal output for developing said switching control signal, said switching control signal being generated in response to said data defining said connection of ones of said input terminals and said data representative of said user's selection of one of said plurality of external signal sources.

14. The signal switching arrangement of claim 13, further comprising:
a third input terminal for receiving an S-video signal from one of said plurality of external signal sources, said third input terminal being coupled to a third input of said switch means, and said output of said switch means being a selected one of said first signal, said second signal, and said S-video signal in response to said switching control signal.

15. The signal switching arrangement of claim 13 wherein said control means is a microprocessor.

16. The signal switching arrangement of claim 13 wherein said data entered during said selection mode of operation is a VCR-ON command.

* * * * *

UNITED STATES PATENT AND TRADEMARK OFFICE
CERTIFICATE OF CORRECTION

PATENT NO. : 4,996,597

DATED : February 26, 1991

INVENTOR(S) : David J. Duffield

It is certified that error appears in the above-identified patent and that said Letters Patent is hereby corrected as shown below:

Title page: [56] References Cited, U.S. PATENT DOCUMENTS, that portion reading "3,841,367" should read -- 4,841,367 --.

Column 10, line 19 (Claim 13), after "of" (second occurrence) insert -- said plurality of external signal sources to said respective ones of --.

Signed and Sealed this

Seventh Day of July, 1992

Attest:

DOUGLAS B. COMER

*Attesting Officer*    Acting Commissioner of Patents and Trademarks